(12) United States Patent
Tanaka

(10) Patent No.: US 6,481,942 B2
(45) Date of Patent: Nov. 19, 2002

(54) CLIP

(75) Inventor: Tsutomu Tanaka, Tochigi-ken (JP)

(73) Assignee: Nifco Inc., Yokohama (JP)

( * ) Notice: Subject to any disclaimer, the term of this patent is extended or adjusted under 35 U.S.C. 154(b) by 0 days.

(21) Appl. No.: 09/858,895

(22) Filed: May 17, 2001

(65) Prior Publication Data

US 2002/0001513 A1 Jan. 3, 2002

(30) Foreign Application Priority Data

May 29, 2000 (JP) ........................................ 2000-157568

(51) Int. Cl.[7] ................................................. F16B 13/06
(52) U.S. Cl. ........................................... 411/45; 411/41
(58) Field of Search ............................. 411/41, 45, 46, 411/47, 48, 49, 50, 51, 53

(56) References Cited

U.S. PATENT DOCUMENTS

| | | | | |
|---|---|---|---|---|
| 4,405,272 A | * | 9/1983 | Wollar | 411/41 |
| 5,211,519 A | * | 5/1993 | Saito | 411/45 |
| 5,322,466 A | * | 6/1994 | Bolli et al. | 24/453 |
| 5,375,954 A | * | 12/1994 | Eguchi | 411/41 |
| 5,641,255 A | * | 6/1997 | Tanaka | 411/45 |

* cited by examiner

Primary Examiner—Lynne H. Browne
Assistant Examiner—Jori Schiffman
(74) Attorney, Agent, or Firm—Kanesaka & Takeuchi

(57) ABSTRACT

A clip is formed of a male and a female members, and can take a temporarily fastened state by inserting an inserting shaft of the male member into an inner side of leg pieces of the female member and a finally fastened state by further inserting the inserting shaft. In the finally fastened state, the leg pieces are widely opened and fixed to the inserting shaft. The clip includes engaging projections, as a correcting device, disposed between the adjacent leg pieces facing each other and allowing the widely opened leg pieces to move inwardly when the male member is moved to the temporally fastened state. Thus, the clip can be easily fastened and removed.

6 Claims, 7 Drawing Sheets

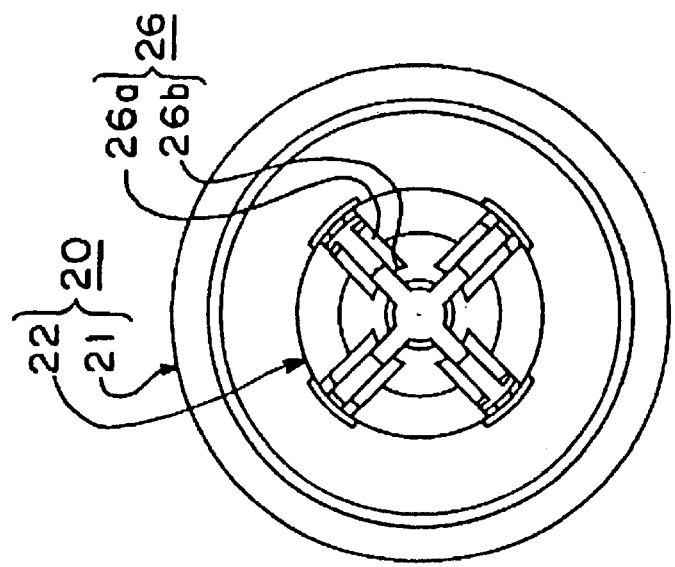
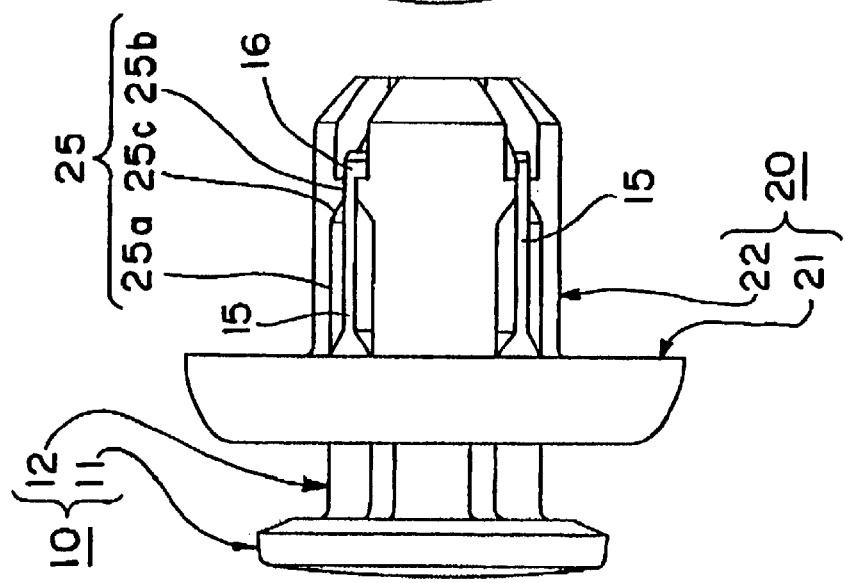
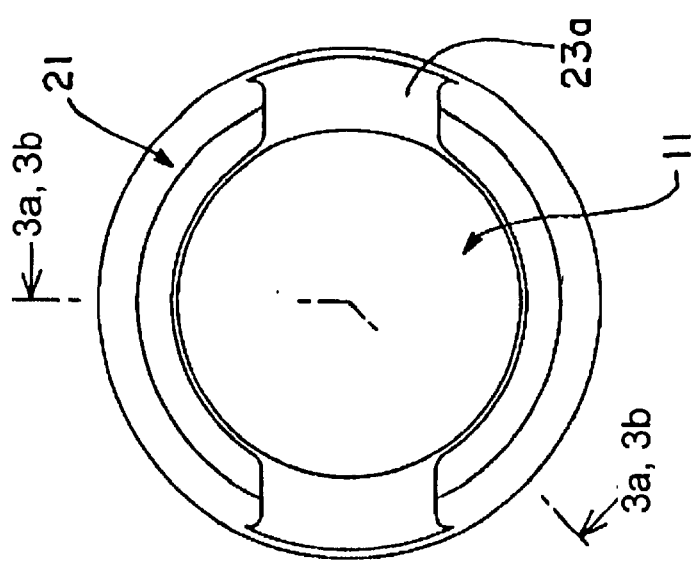

CLIP

BACKGROUND OF THE INVENTION AND RELATED ART STATEMENT

The invention relates to a clip suitable for, for example, coupling a plurality of attaching members, fastening one attaching member to the other attaching member, or fastening a functioning portion provided to the clip to an attaching member.

FIGS. 8(a) and 8(b) show a conventional clip as disclosed in Japanese Utility Model Registration No. 2590817. The clip is formed of a male member 30 and a female member 35, and a member (attaching member) 45 is fastened to a panel surface (attaching member) 40 by the clip, or the attaching members are fastened by the clip. The male member 30 includes a head portion 31, an inserting shaft 32 and an apex portion 33. The inserting shaft 32 has a base end neck portion 34a having a smaller diameter formed by narrowing a periphery of the inserting shaft 32, depressed portions 34b provided at a large diametrical periphery under the base end neck portion 34a, and a forward end neck portion 34c with a small diameter between the inserting shaft 32 and the apex portion 33. The female member 35 includes a flange portion 36, and a plurality of leg pieces 37. Each leg piece 37 has an engaging projection 38 on a forward end inner side thereof.

The male member 30 can take a temporarily fastened state with respect to the female member 35, as shown in FIG. 8(a), wherein the inserting shaft 32 is inserted into an inner hollow portion formed by the leg pieces 37, the apex portion 33 passes through the engaging projections 38, and the engaging projections 38 engage the forward end neck portion 34c. When the inserting shaft 32 is further inserted to release the above-stated engagement, the leg pieces 37 are widened by the large diametrical periphery near the depressed portions 34b. When the depressed portions 34b engage the engaging projections 38, the male member 30 takes a finally fastened state for coupling, as shown in FIG. 8(b), by sandwiching the attaching members 40, 45 between the wide diameter portions of the leg pieces 37 and the flange 36, or fastening the attaching member 40 to the attaching member 45 (the coupling and fastening are substantially the same in that an insertion control operation of the flange 36 and an extraction preventing operation by the large diameter portions of the leg pieces 37 are used).

In case the member 45 is removed from the panel surface 40 or the coupling of the attaching members 40, 45 is released for repairing and so on, for example, a tool is inserted under the head portion 31 of the male member 30, and the male member 30 is extracted against an engaging force between each depressed portion 34b and the engaging projection 38 to change to the temporarily fastened state, as shown in FIG. 8(a). Then, the male and female members 30, 35 are extracted from the respective attaching holes 40a, 45a as one unit.

The clip as described above has good operating ability and is convenient in that after the male and female members 30, 35 are manufactured, they can be handled in the temporarily fastened state; the male and female members 30, 35 can take the finally fastened state from the temporarily fastened state through an insertion operation; and they can be repeatedly used by detaching after use. However, there are yet the following dissatisfied points.

First, the clip of this type is made of resin. Thus, in case the leg pieces 37 are held in a widened state for a long period of time, its elasticity is deteriorated, so that even if the clip is returned to the temporarily fastened state from the finally fastened state, the clip may not be returned to its original state, and the male and female members may not be easily extracted from the attaching holes 40a, 45a. In this structure, the large apex portion 33 is provided at a forward end of the inserting shaft 32, the apex portion 33 is projected outwards from the forward ends of the leg pieces 37, and the leg pieces 37 with the widened diameter are housed inside the apex portion 33 to thereby shrink the widened diameter. Therefore, the apex 33 is projected outwards from the forward ends of the leg pieces 37 and the whole length of the clip becomes long, so that the apex 33 interferes with other members to thereby result in a poor appearance. Further, since the apex 33 receives the forward ends of the leg pieces 37 with the large diameter therein, for example, a large inserting force is required when the clip is set in the temporarily fastened state.

Second, the clip of this type is held in two positions, i.e. the temporarily fastened state for preventing the male member 30 from being extracted from the female member 35 in the state where the diameter of the leg pieces 37 is not widened, and the finally fastened state for preventing the male member 30 from being extracted from the female member 35 in the state where the diameter of the leg pieces 37 is widened. In order to hold the temporarily fastened state, as shown in FIG. 8(a), there is an engaging structure formed of a step portion (forward end neck portion 34c) on the inserting forward end side of the male member 30, and the projections (engaging projections 38) on the forward end side of the female member 35; or there is an engaging structure formed of depressed portions and projecting portions to be engaged with and disengaged from each other provided at opposed inner portions of a male member side inserting shaft and female member side leg pieces.

The former case has the problems as described above. The latter case has such problems that the projecting portions are disposed on an inner periphery of a cylinder formed of the leg pieces to thereby cause abrasion. Also, an operating ability when the inserting shaft is further inserted to take the finally fastened state, or conversely, when the inserting shaft is extracted from the finally fastened state to the temporarily fastened state, is deteriorated. Further, a close contact ability when the inserting shaft is inserted into the cylinder formed of the leg pieces is lowered, and the like.

In view of the above defects, the present invention has been made, and an object of the invention is to provide a clip to obviate all the above-described defects at the same time, wherein even in case the widely opened leg pieces are returned to the original small diametrical cylinder, the whole length of the clip can be shortened; the male member does not rotate inadvertently with respect to the female member; and in case the male member is extracted from the finally fastened state to the temporarily fastened state, the male member is not inadvertently disengaged from the female member to thereby raise reliability of the clip.

Further objects and advantages of the invention will be apparent from the following description of the invention.

SUMMARY OF THE INVENTION

In order to attain the above objects, a clip includes a male member and a female member, wherein the male member is formed of a head portion and an inserting shaft, and the female member is formed of a flange portion having an inserting hole and a plurality of leg pieces disposed in a substantially cylindrical shape through upper and lower slits.

Thus, the male and female members are held in a temporarily fastened state by inserting the inserting shaft through the inserting hole into an inner side of the leg pieces, and are held in a finally fastened state by further inserting the inserting shaft to enlarge the diameter of the leg pieces to thereby fasten the clip to an attaching member or attaching members. The clip according to the present invention includes, as correcting devices, engaging projections provided between at least a pair of adjacent leg pieces out of the plural leg pieces for narrowing the widened diameter of the leg pieces by extracting the male member to take the temporarily fastened state from the finally fastened state.

According to the structure as described above, since the correcting devices are disposed between the leg pieces, in other words, corresponding to the upper and lower slits, the whole length of the male member can be shortened, and consequently, the whole length of the clip can also be shortened when compared with the conventional structure wherein the large apex is provided at the forward end of the inserting shaft. Also, since spaces of the upper and lower slits between the adjacent leg pieces are used, it is facilitated to prevent an inserting force of the male member from becoming larger than it is necessary; conversely, to prevent the temporarily fastened state from being inadvertently released; and to prevent the temporarily fastened state from being unstable.

By the way, in the specification, "to hold the temporarily fastened state" means that the male member is prevented from being extracted from the female member in a state where the leg pieces are not substantially widened. "To hold the finally fastened state" means that the male member is prevented from being extracted from the female member in a state where the leg pieces are widened. "To fasten the attaching members to each other" means that in case members more than two are coupled with or fastened to each other, one or plural members on a side to be attached is coupled with or fastened to the other one or plural members on a side to be fastened.

It is preferable that the above described invention is embodied as follows.

First, step portions are disposed at side edge portions of the respective leg pieces and forming inclined cam surfaces lowered in a direction of a central line of the leg pieces as the inclined cam surfaces approach a forward end. The engaging projections are formed on forward end sides of ribs provided to the inserting shaft and slidably moved by fitting into the. upper and lower slits. In this case, relative rotations of the male and female members are prevented through fitting of the ribs with the upper and lower slits, and insertion and extraction of the inserting shaft are carried out by the guiding actions of the upper and lower slits and ribs.

Therefore, even if the engaging projections are separated from the inclined cam surfaces in the finally fastened state where the leg pieces are widened, the leg pieces are positively returned to the initial shapes since the engaging projections abut against the raised portions of the inclined cam surfaces through extraction accompanied by the guiding actions of the male member.

Second, the step portion is formed such that a thickness of an edge portion on a side of the leg piece is partially made thin, and the temporarily fastened state is held through an engagement of the engaging projection with the raised step end surface of the inclined cam surface. The step end surface of the step portion is used as a portion for holding the temporarily fastened state together with the engaging projection. Its advantages reside in that a space between the leg pieces and the inserting shaft can be made small as little as possible; the temporarily fastened state and the finally fastened state can be positively held by the different exclusive portions of the male and female members; and even in that case, the whole length of the clip can be shortened.

Third, the finally fastened state is held by engagements of the claw portions provided on the inner sides of the forward ends of the leg pieces and engaging steps provided between the ribs and located around the forward end of the inserting shaft. Contrary to the conventional clip, the claw portions and the engaging steps are provided at the forward ends of the corresponding leg pieces and inserting shaft, and the male member does not almost project from the female member to thereby make the clip of the invention compact.

Fourth, each rib includes a first rib portion positioned on a side of the head portion and having a large width, and a second rib portion positioned on a forward end side and having a small width. The second rib portions are provided with the engaging projections. The upper and lower slits include a wide first slit portion corresponding to the first rib portion and a narrow second slit portion corresponding to the second rib portion. The step portion is provided to the leg piece portion facing the second slit portion. With this structure, the above-stated guiding actions can be made more stable, and the structure for holding the temporarily fastened state can be easily realized.

According to another aspect of the invention which is directed to a holding structure for holding the temporarily fastening state of the above invention, a clip is formed of a male member and a female member, wherein the male member has a head portion and an inserting shaft; the female member includes a flange portion with an inserting hole and a plurality of leg pieces disposed in a cylindrical shape through upper and lower slits; the male and female members are held in the temporarily fastened state by inserting the inserting shaft into a cylindrical inner side of the leg pieces through the inserting hole; and a finally fastened state can be obtained by further inserting the inserting shaft so that the leg pieces are widely opened to be fastened to an attaching member or members.

The inserting shaft has ribs slidably moved along the slits by fitting into the upper and lower slits, and engaging projections provided at forward end sides of the respective ribs. The plural leg pieces have step portions disposed on the side edge portions of at least a pair of adjacent leg pieces and having a depth capable of housing the engaging projections within the thickness of the leg piece. In the temporarily fastened state, each engaging projection engages the step end surface of the step portion within the thickness of the leg piece.

According to the above structure, contrary to the engaging structure, as mentioned in the prior art, wherein the depressed portions and projecting portions to be engaged with and disengaged from each other are provided to portions facing an inner diameter direction of the inserting shaft of the male member and the leg pieces of the female member, the above-stated guiding actions and operating ability of insertion or extraction of the inserting shaft 12 are added, while projecting portions in the diametrical direction are omitted. Thus, factors causing abrasions are removed to thereby improve a close contacting ability of the inserting shaft in the cylinder formed by the leg pieces.

BRIEF DESCRIPTION OF THE DRAWINGS

FIG. 4(a) is a plan view of the temporarily fastened state of the above constituting members;

FIG. 4(b) is a side view of the temporarily fastened state of the above constituting members;

FIG. 4(c) is a bottom view of the temporarily fastened state of the above constituting members;

DETAILED DESCRIPTION OF PREFERRED EMBODIMENTS

Figure 1:
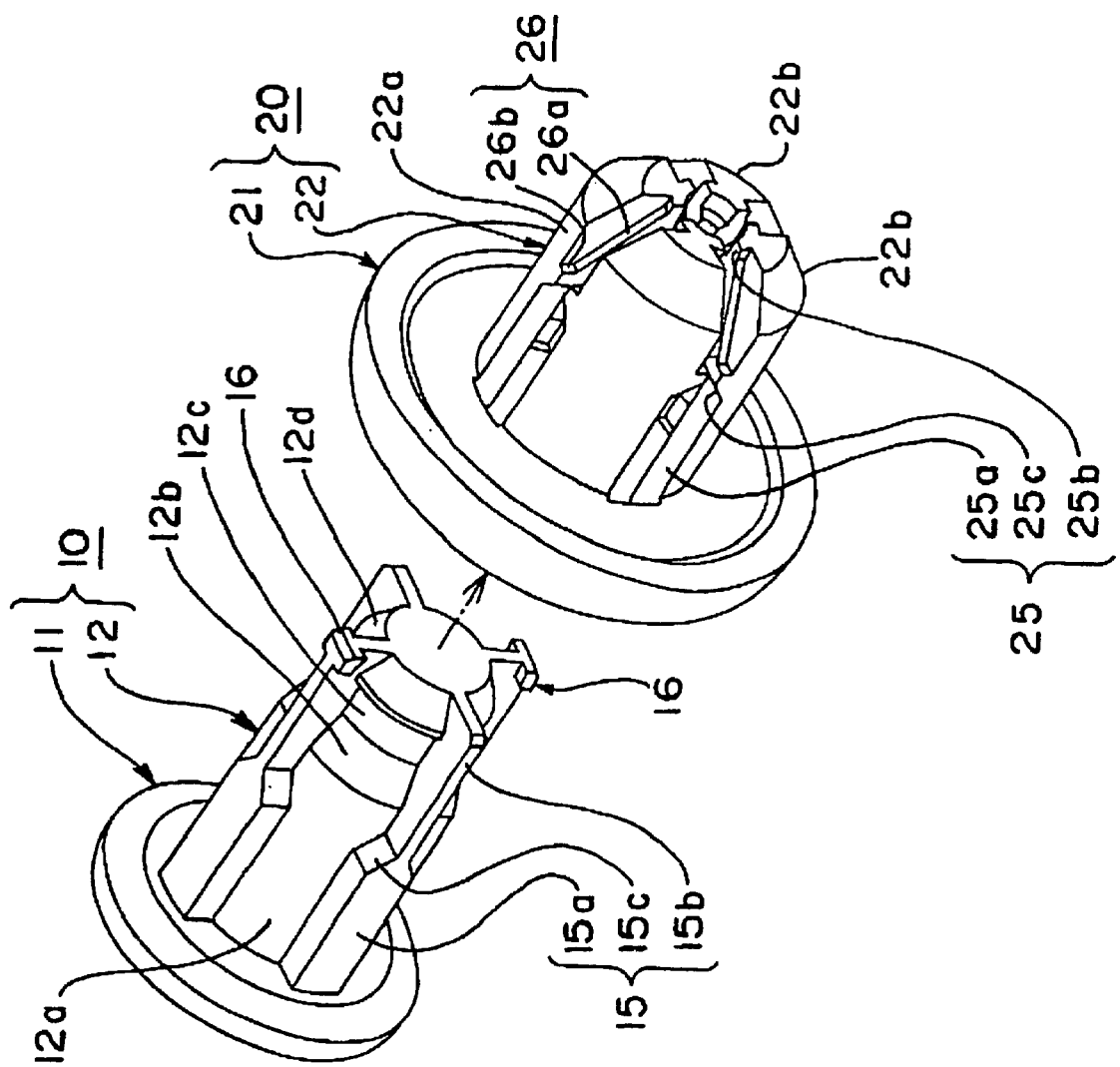
FIG. 1 is a perspective view showing male and female members for constituting a clip of an embodiment according to the present invention.
Figure 2A:
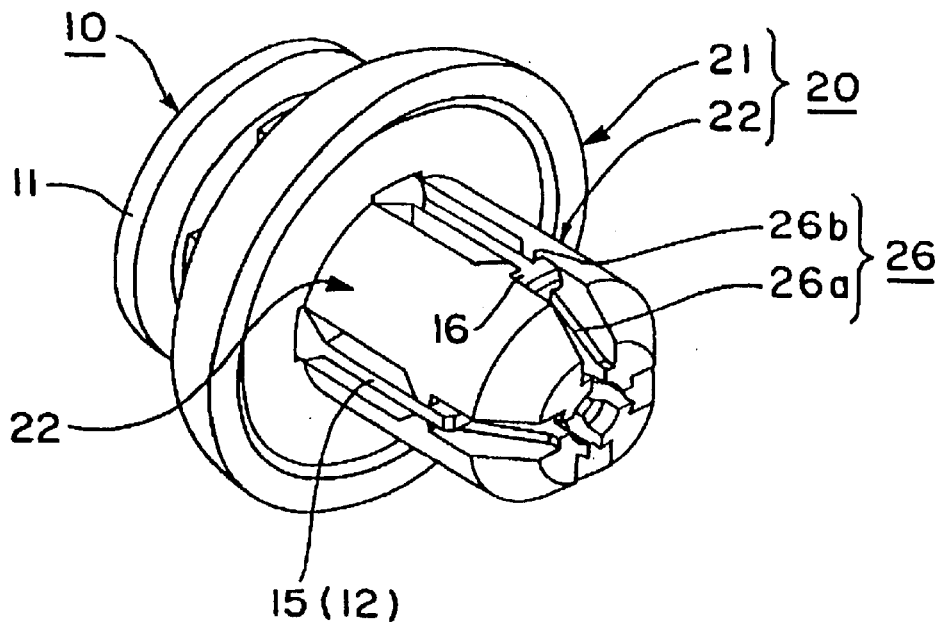
FIG. 2(a) is a perspective view showing a temporarily fastened state of the above constituting members.
Figure 2B:
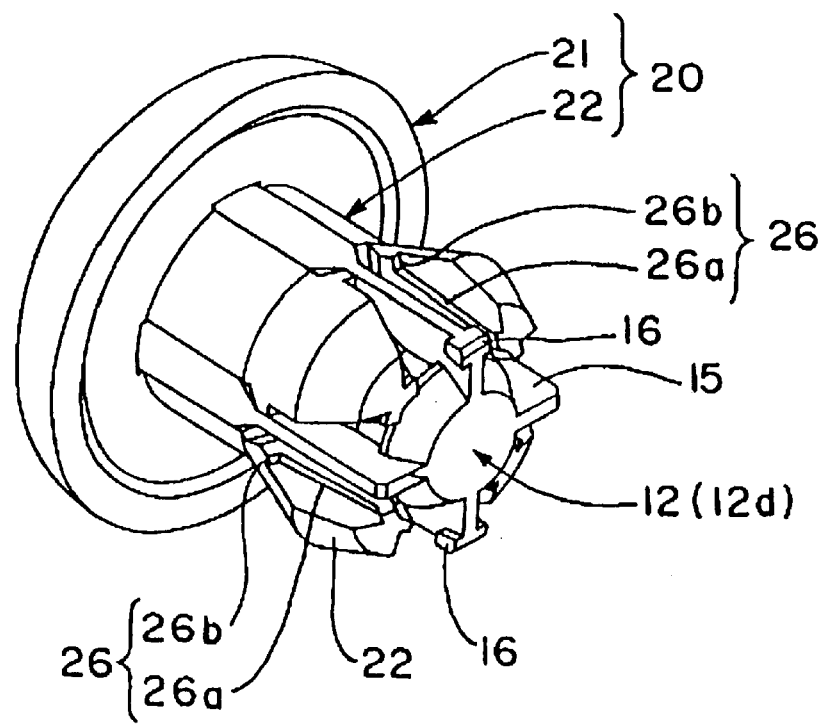
FIG. 2(b) is a perspective view showing a finally fastened state of the above constituting members.
Figure 3A:
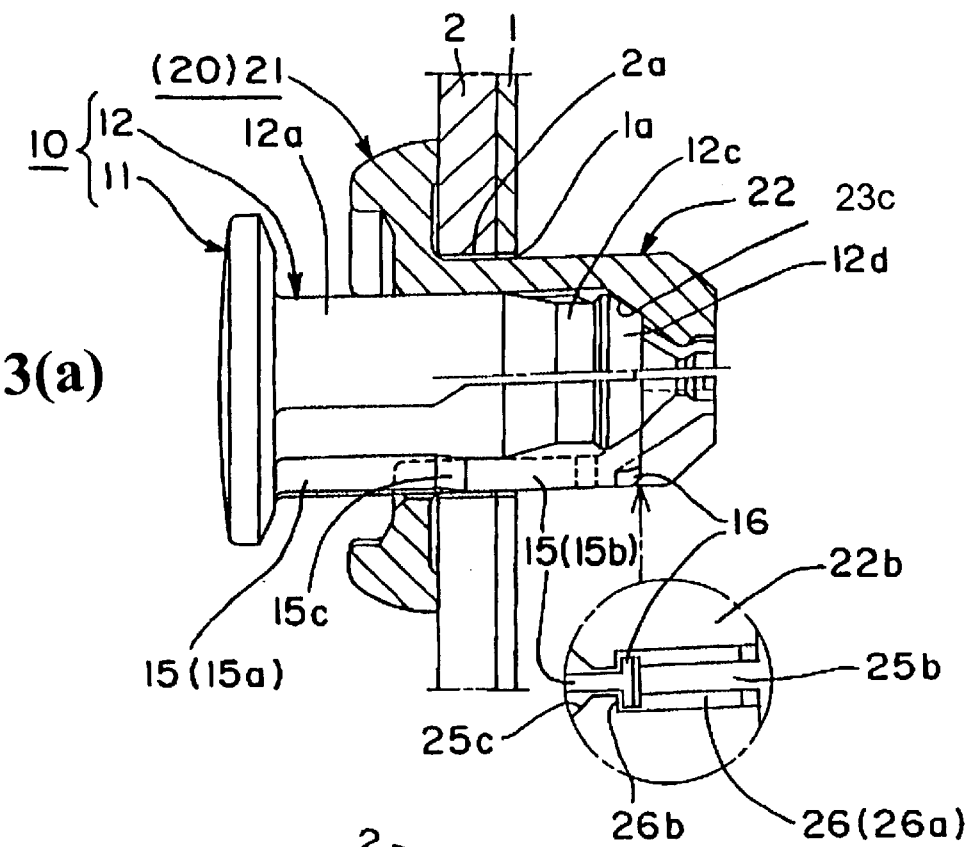
FIG. 3(a) is a sectional view of the temporarily fastened state of the above constituting members, wherein only the female member is shown by a section taken along line 3(a)—3(a) in FIG. 4(a)
Figure 3B:
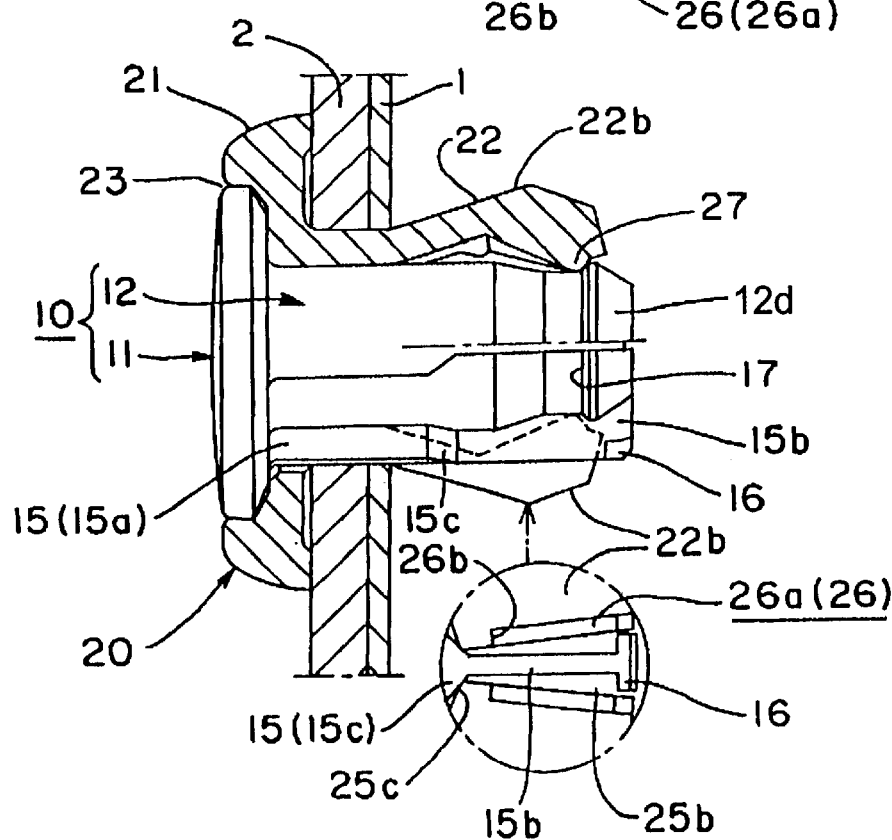
FIG. 3(b) is a view of the finally fastened state of the above constituting members, wherein only the female member is shown by a section taken along line 3(b)—3(b) in FIG. 4(a)
Figure 5C:
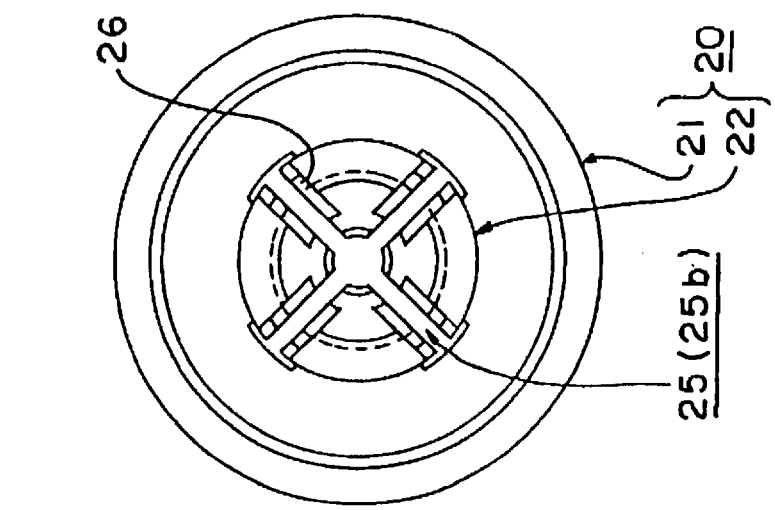
FIG. 5(c) is a bottom view of the female member.
Figure 5B:
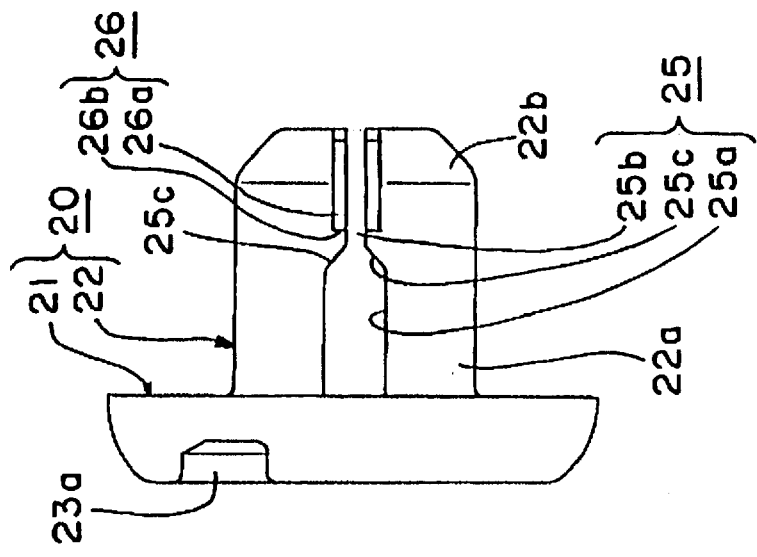
FIG. 5(b) is a side view of the female member.
Figure 5A:
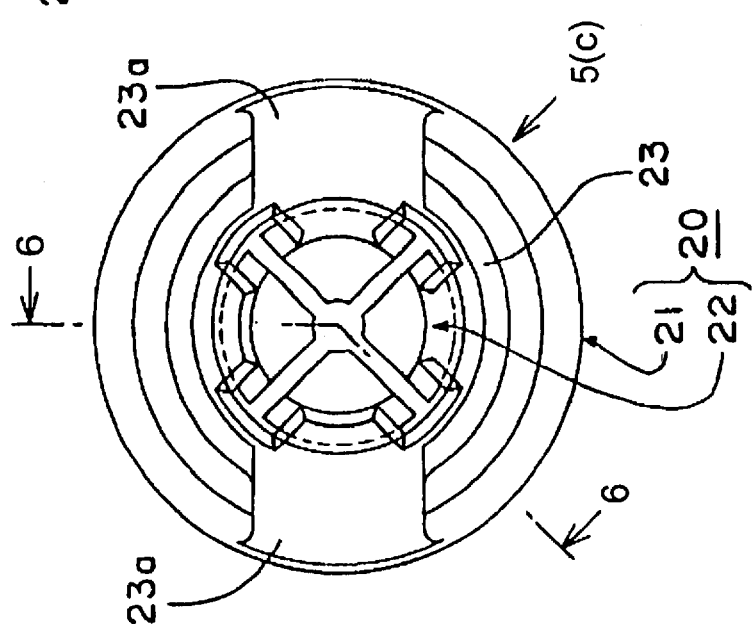
FIG. 5(a) is a plan view of the female member.
Figure 6:
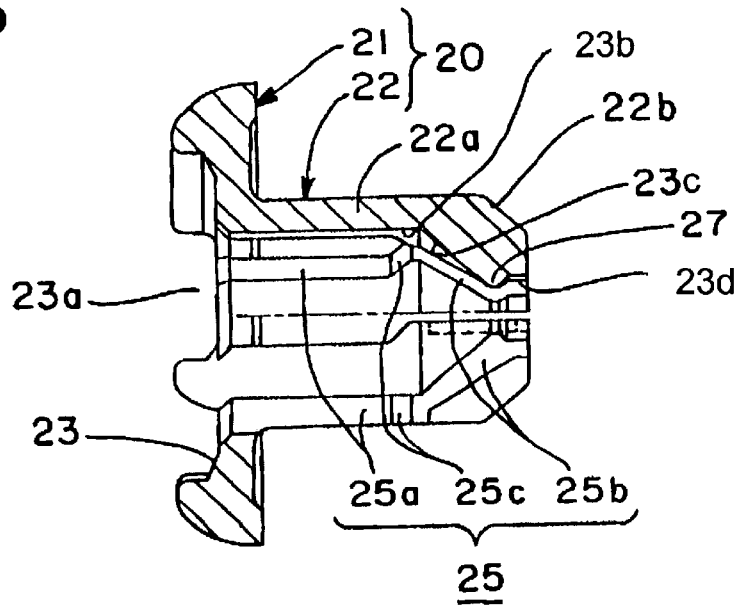
FIG. 6 is a sectional view taken along line 6—6 in FIG. 5(a)
Figure 7A:
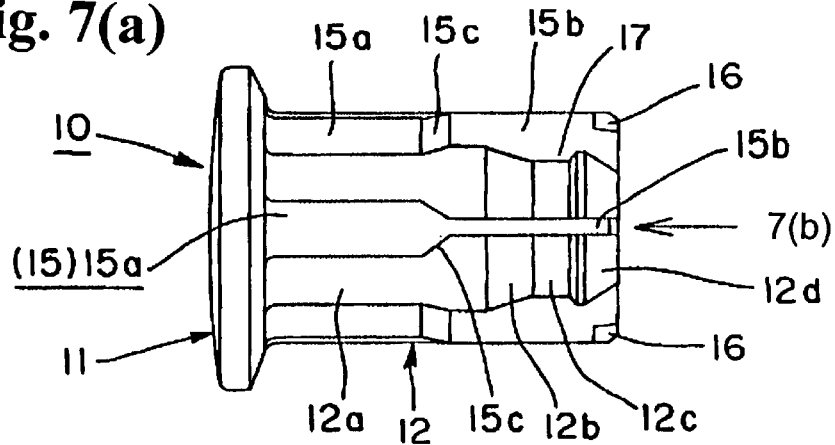
FIG. 7(a) is a side view of the male member.

Hereunder, preferred embodiments of the invention are explained with reference to the accompanying drawings. FIG. 1 is a perspective view for showing a relationship between a male member and a female member constituting a clip. FIG. 2(a) is a perspective view for showing a temporarily fastened state of the clip; and FIG. 2(b) is a perspective view for showing a finally fastened state of the clip. FIG. 3(a) is a view for showing the temporarily fastened state of the clip, wherein only the male member is shown with a section taken along line 3(a)—3(a) in FIG. 4(a); and FIG. 3(b) is a view for showing the finally fastened state of the clip, wherein only the male member is shown with a section taken along line 3(b)—3(b) in FIG. 4(a). FIG. 4(a) is a diagram showing the temporarily fastened state of the clip viewed from a head side; FIG. 4(b) is a diagram for showing the temporarily fastened state of the clip viewed from a side thereof; and FIG. 4(c) is a diagram for showing the temporarily fastened state of the clip viewed from a leg piece side. FIG. 5(a) is a diagram showing the female member viewed from a head side; FIG. 5(b) is a diagram for showing the female member viewed from a direction 5(c) in FIG. 5(a); and FIG. 5(c) is a diagram for showing the female member viewed from the leg piece side. FIG. 6 is a sectional view taken along line 6—6 in FIG. 5(a). FIG. 7(a) is a side view of the female member; and FIG. 7(b) is a diagram of the female member viewed from a direction 7(b) in FIG. 7(a).

A clip of an embodiment according to the invention is the same as a conventional clip in that the clip is formed of a male member 10 and a female member 20 as a resin formed product; the male member 10 has a head portion 11 and an inserting shaft 12; the female member 20 has a flange portion 21 and a plurality of leg pieces 22 disposed in a cylindrical shape through upper and lower slits 25; the male member 10 and the female member 20 are held in the temporarily fastened state by inserting the inserting shaft 12 into an inner side of the leg pieces 22; and when the inserting shaft 12 is further inserted, the leg pieces 22 are widened to take the finally fastened state to thereby fasten the attaching members 1 and 2. Improved points resides in, especially, an engagement structure for holding the temporarily fastened state of the male member 10 with respect to the female member 20, and a reducing diameter structure for reducing the widened diameter of the leg pieces 22 to an original shape. In the following explanation, the respective structures of the male and female members 10, 20 are explained together with the basic operations thereof and, thereafter, operations of the essential portions are explained.

Figure 7B:
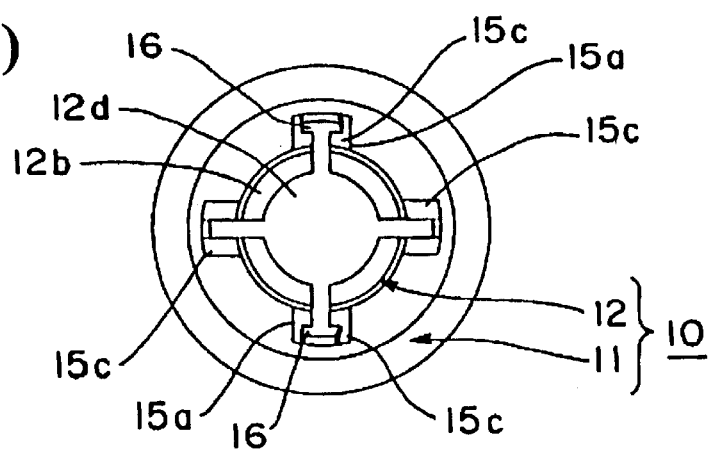
FIG. 7(b) is a bottom view of the male member.

In the present embodiment, as shown in FIGS. 1, 7(a) and 7(b), the head portion 11 of the male member has substantially a disc shape, and the inserting shaft 12 vertically projects from a lower surface of the head portion 11. The inserting shaft 12 includes the largest diameter cylindrical portion 12a extending from the lower surface of the head portion 11 to about an intermediate portion; an inclined portion 12b formed at a forward end side of the largest diameter cylindrical portion 12a to form a small diameter portion; a small diameter cylindrical portion 12c on a forward end side of the inclined portion 12b; and an inserting shaft forward end portion 12d on a forward end side of the small diameter cylindrical portion 12c. Also, the inserting shaft 12 has four ribs 15 extending over the whole length from the largest diameter cylindrical portion 12a to the inserting shaft forward end portion 12d, and engagement projections 16 disposed on the forward end sides of the ribs 15.

The inserting shaft forward end 12d has a bowl or inclined shape where the forward end gradually becomes a small diameter to be easily inserted into the female member 20. The small diameter cylindrical portion 12c has a step or level difference relative to an inner end of the inserting shaft forward end portion 12d, and the level difference becomes an engaging step 17 to engage claw portions 27 of the leg pieces 22 in the finally fastened state shown in FIG. 3(b).

The ribs 15 correspond to upper and lower slits 25 disposed between the leg pieces 22 of the female member 20, and are disposed at positions for dividing a periphery of the inserting shaft 12 into quarters. Heights of the ribs 15 are the same from the largest diameter cylindrical portion 12a to the inserting shaft forward end portion 12d. Each rib 15 includes a first rib portion 15a with the widest width located in the largest diameter cylinder portion 12a to the inclined portion 12b on this side; a second rib portion 15b with a narrow width in about one third of the first rib portion 15a located on the forward end side thereof; and a wedge portion 15c inclined from the first rib portion 15a toward the second rib portion 15b located therebetween. The engagement projections 16 are provided at only two ribs located on a straight line, i.e. one plane, among the four ribs 15. Each engagement projection 16 has the same outer surface as an outer surface of the rib 15, and projections extending from both sides of the second rib portion 15b. The projecting lengths to the right and left sides of the second rib portion 15b are smaller than the width of the first rib portion 15a.

In the present embodiment, as shown in FIGS. 1, 5(a), 5(b), 5(c) and 6, the flange portion 21 has a recessed portion 23 for housing a head portion 11 therein, and an inserting hole for inserting the inserting shaft 12 to the side of the leg pieces 22 together with the ribs 15, and a plurality of the leg pieces 22 is disposed in a substantially cylindrical shape through the upper and lower slits 25. The flange portion 21 has notch portions 23a formed by cutting portions of the periphery of the recessed portion 23 where the head 11 is fitted. In the condition where the head portion 11 is fitted in the recessed portion 23 of the flange portion 21, the notch portions 23a facilitate an operation for extracting the male member 10 by inserting a tool, such as a driver, under the head portion 11 of the male member 10 from the notch portion 23a. Incidentally, the notch portions 23a are omitted in FIGS. 1 and 2(a), 2(b).

The leg pieces 22 are disposed in a state such that a cylinder is equally divided by four upper and lower slits 25, so that the cylinder is formed of the same four shape portions. Each upper and lower slit 25 is formed of a first slit portion 25a having a large width corresponding to the first rib portion 15a; a second slit portion 25b having a small width corresponding to the second rib portion 15b and positioned on a forward end side of the first slit portion 25a; and an inclined slit portion 25c for receiving the wedge portion 15c in the finally fastened state. Therefore, each leg portion 22 has a shape substantially corresponding to the upper and lower slit 25, and a width of the leg portion 22a between both first slit portions 25a is small and a width of the leg portion 22b between both second slit portions 25b is slightly larger than that between the first slit portions 25a. However, a step portion 26 is formed on a side edge portion of the leg portion 22b with a space slightly away from the inclined slit portion 25c. Therefore, externally, a plate width of the leg portion between both inclined slit portions 25c can be seen largest.

The leg piece 22, as shown in FIG. 3(b), has a length such that in the finally fastened state where the inserting shaft 12 is inserted into a cylinder (inner side) of the leg pieces, a forward end of the inserting shaft 12 projects from the cylinder for several millimeters. An inner diameter of the cylindrical shape formed of the leg pieces 22 is substantially the same as or slightly larger than that of the large diameter cylindrical portion 12a of the inserting shaft 12, so that when the inserting shaft 12 is inserted, an inner surface 23b (refer to FIG. 6) contacts the large diameter cylindrical portion 12a as close as possible. The leg portions 22b form a smaller diameter as it approaches the forward end thereof, and are provided with claw portions 27 on an inner periphery at the forward end side.

In other words, the leg portions 22b, as shown in FIG. 6, have inclined inner surfaces 23c getting close to a center line thereof as it approaches the forward end thereof, so that when the inserting shaft 12 is inserted thereinto, the diameter of the leg portions 22b is widened by the largest outer diameter portion of the inserting shaft forward end portion 12d. The claw portions 27 become the smallest cylindrical inner diameter by forming the inner diameter of the foremost ends of the leg portions 22b to have the large diameter inner surfaces 23d, so that when the inserting shaft 12 is entirely inserted into the cylinder formed of the leg pieces, the claw portions 27 engage the engaging steps 17 to hold the finally fastened state.

The step portions 26 are disposed on both side edges of the leg portion 22b, and the step portion extends from a portion slightly apart from each inclined slit portion 25c to the foremost end. The step has a width for allowing a portion corresponding to the engaging projection 16 to escape. A depth of the step is formed such that a side of the inclined slit portion 25c is shallow (however, when the engaging projection 16 is inserted therein, it does not project outside), and a side of the leg piece forward end is formed deep. In other words, bottom surfaces of the step portions 26 provided along the side edges of the leg portions 22b become inclined cam surfaces 26a lowering toward the center line of the cylinder formed of the leg pieces 22 as it approaches the forward end. Then, the step portions 26 hold the temporarily fastened state through engagement of the engaging projections 16 with high portions of the step end surfaces 26b of the inclined cam surfaces 26a.

A using method of the above-described clip is the same as that of the conventional clip in that the male member 10 and the female member 20 are held in the temporarily fastened state by inserting the inserting shaft 12 into the inner hollow portion surrounded by the leg pieces 22; and then, when the male member 10 is further inserted thereinto to take the finally fastened state, as shown in FIG. 3(b), attaching members 1, 2 are sandwiched between the wide diameter portions of the leg pieces 22 and the flange 21 to connect thereof, or one attaching member 1 is fastened to the other attaching member 2. In the basic operation, in the structure of the invention, first, when the temporarily fastened state is formed, the male member 10 is inserted into the female member 20 by fitting the ribs 15 into the upper and lower slits 25, so that the male member 10 is smoothly inserted along the upper and lower slits 25. Then, after the engaging projections 16 reach the inclined slit portions 25c, when a predetermined insertion power is applied, the engaging projections 16 slightly widens the leg pieces 22 on both sides and enters the second narrower slit portions 25b from the inclined slits portions 25c (the leg pieces 22 are returned to their original states). Thus, the male member 10 is temporarily fastened to the female member 20.

In the temporarily fastened state, as shown by an enlarged portion in FIG. 3(a), the engaging projection 16 is located in the step portions 26 to engage the raised step end surfaces 26b of the inclined cam surfaces 26a to prevent the inserting shaft 12 from being extracted. Also, since the inserting shaft forward end portion 12d abuts against the inclined inner surface 23b, unless the inserting shaft 12 receives the predetermined inserting force, it is not inserted further. When transportation or part assembly is carried out, for example, the products may be packed in a box, or the products may be subjected to vibrations. However, in addition to the engagement of the engaging projections 16 and the step end surfaces 26b, the step end surfaces 26b are positioned at the highest place of the inclined cam surfaces 26a; the inserting shaft forward end portion 12d is controlled by the inclined inner surfaces 23b; and the relative rotations of the male and female members 10, 20 are prevented by fitting of the ribs 15 and upper and lower slits 25. Therefore, there is no possibility of changing to the finally fastened state inadvertently, or releasing the temporarily fastened state.

When the male member 10 is further inserted from the temporarily fastened state, it becomes the finally fastened state. In the course of the insertion, the male member 10 advances straight with the help of the ribs 15 fitted into the upper and lower slits 25, and the inserting shaft forward end portion 12d pushes the inclined inner surfaces 23b outwards to thereby widen the leg portions 22b. When the leg portions 22b are widened, the slit width of the second slit portion 25b also becomes larger as shown by enlarged portion in FIG. 3(b), so that the engaging projection 16 is separated from the step portions 26 as the leg pieces 22 are widened. When the wedge portions 15c engage the inclined slit portions 25c, the claw portions 27 engage the engaging steps 17 to hold the finally fastened state.

A holding force of the finally fastened state is in proportion to a pressure contact force of the claw portions 27 with respect to the engaging steps 17. In the structure of the invention, for example, in case large vibrations are given from a side of the attaching members 1, 2, the relative rotations of the male and female members 10, 20 are prevented through the fitting of the ribs 15 and the upper and lower slits 25, and the wedge portions 15c engage the inclined slit portions 25c to hold the leg pieces 22 in the widened state. Thus, the claw portions 27 are not inadvertently disengaged from the engaging steps 17 to thereby stably hold the engaging state.

In case of a repair or the like, when the attaching member 2 is removed from the attaching member 1 or coupling of the attaching members 1, 2 is released, a tool is inserted under the head portion 11 of the male member 10 from the notch portion 23a. Then, the male member 10 is extracted against an engaging force of the claw portions 27 and the engaging steps 17, and the male and female members 10, 20 in the temporarily fastened state are removed from the attaching holes 1a, 2a as one unit. In that case, even if the leg pieces 22 may be deteriorated in elasticity to be a widened diameter state, in the structure of the invention, as the correcting devices, the step portions 26 and engaging projections 16 effectively function.

More specifically, in the correcting device, through the extracting operation of the male member 10, the engagements between the claw portions 27 and the engaging steps 17 are released, so that the claw portions 27 are disposed on the outer surfaces of the leg portions 22b, and the inserting shaft 12 is straightly moved backwards through the guiding actions of the ribs 15 and the upper and lower slits 25. When the engaging projections 16 are withdrawn in association therewith, the engaging projections abut against the raised portions of the inclined guiding surfaces 26a and push the leg pieces 22 to the original positions, i.e. in the direction of the center of the leg pieces 22, and when the engaging projections 16 abut against the step end surfaces 26b while forcibly correcting the shapes of the leg pieces 22, the engaging projections 16 are stopped. Therefore, in the structure of the invention, with the engaging projections 16 provided at the ribs 15 of the inserting shaft 12, when the engaging projections 16 abut against the inclined cam surfaces 26a, the leg pieces 22 are positively returned to the original shapes.

Incidentally, in the present invention, for example, the number of the upper and lower slits and leg pieces, the shape and the number of the engaging projections and the like may be varied.

As explained above, the clip according to the present invention has the following advantages.

Figure 8A:
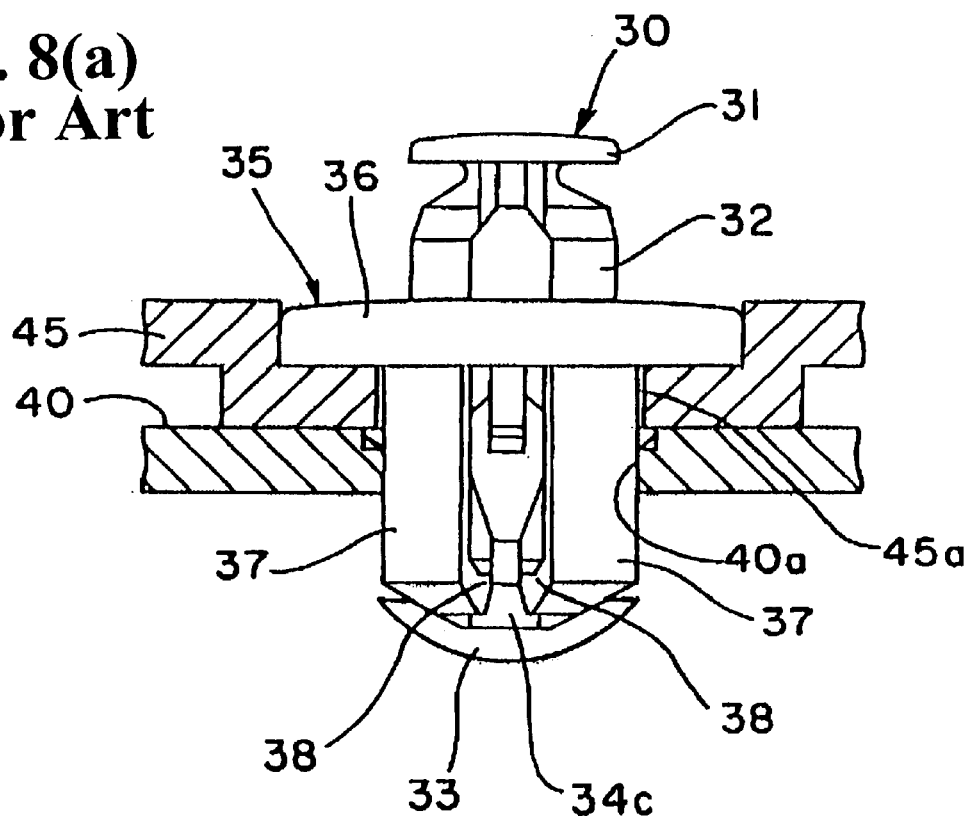
FIG. 8(a) is a diagram showing the temporarily fastened state of a conventional clip.
Figure 8B:
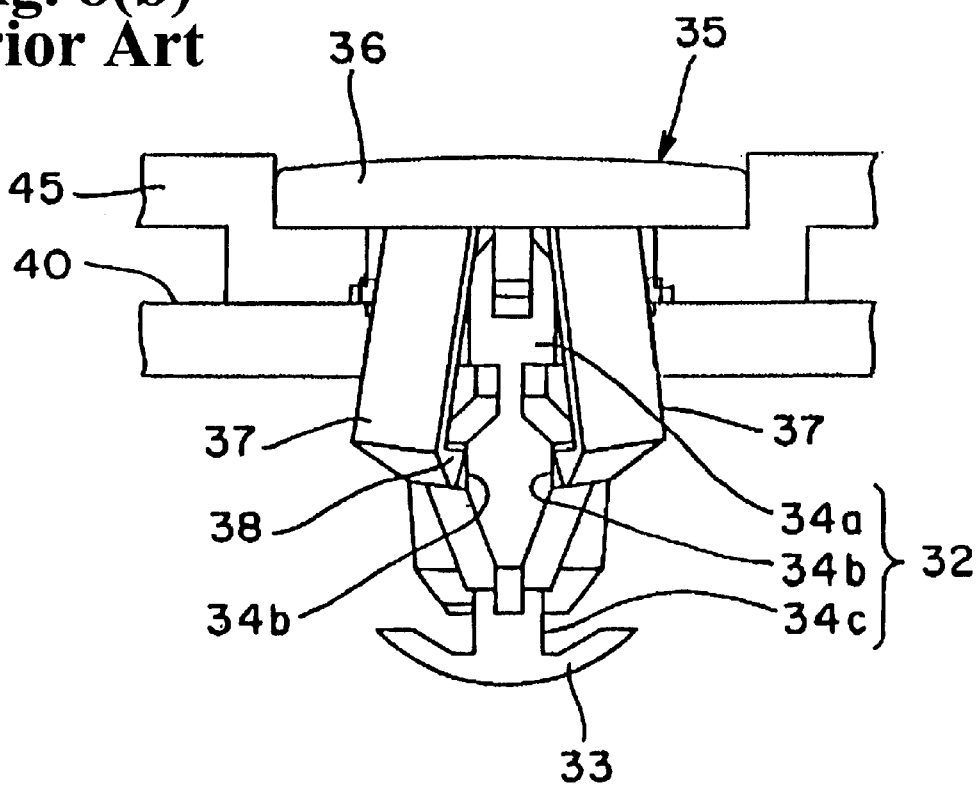
FIG. 8(b) is a diagram showing the finally fastened state of the conventional clip.

In one aspect of the invention, contrary to the conventional clip as shown in FIGS. 8(a) and 8(b), since the spaces of the upper and lower slits among the leg pieces are used, the whole length of the male member, especially the inserting shaft, can be shortened to thereby shorten the whole length of the clip. Therefore, the inserting force of the male member does not become too large to thereby improve an operating ability. Even in that case, there is no possibility such that the temporarily fastened state is inadvertently released and the temporarily fastened state becomes unstable when the male member is extracted.

According to another aspect of the invention, as the engaging structure for holding the temporarily fastened state, with respect to the conventional structure wherein depressed portions and projecting portions for engaging therewith or disengaging therefrom are provided to portions opposed to the diametrical direction of the inserting shaft and leg pieces, the inserting shaft of the invention can be easily inserted or extracted by the guiding operation, and relative rotation preventing operation of the upper and lower slits and the libs. Also, since the projecting portions in the diametrical direction are omitted, there is no abrasion factor, so that a close contact ability of the inserting shaft against the leg pieces can be obtained. Therefore, the clip of the invention can be made compact, and exceeds in operating ability and reliability when it is repeatedly used.

While the invention has been explained with reference to the specific embodiments of the invention, the explanation is illustrative and the invention is limited only by the appended claims.

What is claimed is:

1. A clip comprising:
   a male member having a head portion, and an inserting shaft extending from the head portion,
   a female member having a flange with an inserting hole, a plurality of leg pieces extending from the flange and disposed in a substantially cylindrical shape, and slits dividing the leg pieces, said female member partly receiving the inserting shaft inside the leg pieces to take a temporarily fastened state and further receiving the inserting shaft to take a finally fastened state so that the leg pieces are widely opened and fastened to the inserting shaft,
   engaging projections formed at the inserting shaft and located between the leg pieces at least at the temporarily fastened state as a correcting device for correcting postures of the leg pieces, when extracting the male member from the finally fastened state to the temporarily fastened state said engaging projections engaging and pushing the leg pieces opened outwardly at the finally fastened state to move radially inwardly to the temporarily fastened state so that the postures of the leg pieces are urged to return to the initial temporarily fastened state.

2. A clip according to claim 1, further comprising step portions located at side edge portions of the leg pieces facing each other and forming inclined cam surfaces lowered toward a central line of the female member as a distance to a forward end of the female member is reduced; and ribs provided at the inserting shaft and slidably fitted into the slits, said engaging projections being formed at forward ends of the ribs to engage the step portions.

3. A clip according to claim 2, wherein said step portion is formed integrally at the side edge portion of the leg piece to have a thickness less than that of the leg piece, said engaging projections engaging two inclined cam surfaces adjacent to each other at a position away from the central line position thereof to thereby take the temporarily fastened state.

4. A clip according to claim 3, wherein said leg pieces have claw portions provided inside forward end portions thereof, and said inserting shaft includes engaging steps between the ribs to surround a forward end area thereof, said claw portions engaging the engaging steps at the finally fastened state.

5. A clip according to claim 4, wherein said rib includes a first rib portion positioned on a head side and having a large width, and a second rib portion positioned on a forward end side and having a narrow width less than that of the large width and the engaging projection; and said slit includes a first slit portion having a large slit width corresponding to the first rib portion and a second slit portion having a narrow slit width less than the large slit width corresponding to the second rib portion, said step portion being formed on a portion of the leg piece facing said second slit portion.

6. A clip comprising:

a male member having a head portion, an inserting shaft extending from the head portion, ribs formed on an outer periphery of the shaft to extend along a longitudinal direction thereof and engaging projections formed at forward ends of the ribs and extending laterally outwardly therefrom, and a female member having a flange with an inserting hole, a plurality of leg pieces extending from the flange and disposed in a substantially cylindrical shape, and slits dividing the leg pieces and slidably receiving the ribs therein, said leg pieces situated adjacent to each other having step portions on side edge portions facing each other, said step portions having thicknesses to form spaces in the leg pieces for receiving the engaging projections therein, said female member partly receiving the inserting shaft inside the leg pieces to take a temporarily fastened state where the engaging projections engage the step portions at an end thereof, and further receiving the inserting shaft to take a finally fastened state so that the leg pieces are widely opened and fastened to the inserting shaft, when extracting the male member from the finally fastened state to the temporarily fastened state said engaging projections engaging the step portions and pushing the leg pieces opened outwardly at the finally fastened state to move radially inwardly to the temporarily fastened state so that postures of the leg pieces are urged to return to the initial temporarily fastened state.

* * * * *